Jan. 30, 1923.
C. H. BROCKMANN.
DRAFT EQUALIZER.
FILED FEB. 24, 1920.
1,443,457.
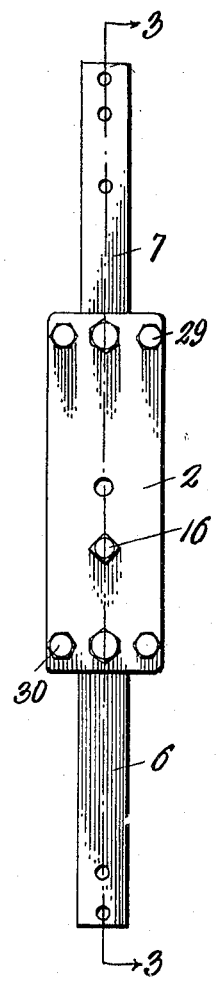
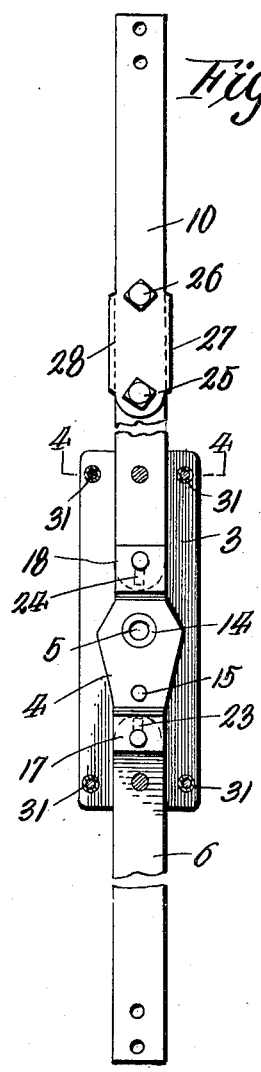
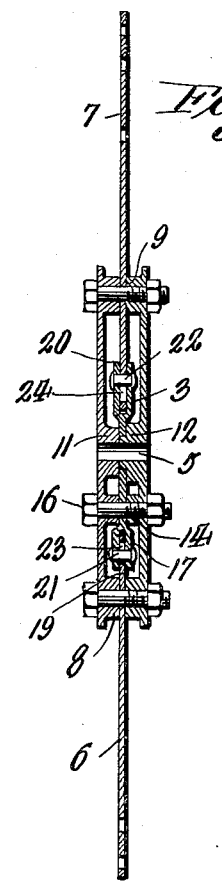
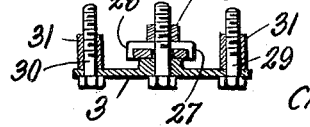
WITNESSES
Inventor
CHRISTIAN H. BROCKMANN
By Richard B. Owen
Attorney Patented Jan. 30, 1923.

1,443,457

UNITED STATES PATENT OFFICE.

CHRISTIAN H. BROCKMANN, OF UNION CENTER, WISCONSIN.

DRAFT EQUALIZER.

Application filed February 24, 1920. Serial No. 360,886.

*To all whom it may concern:*

Be it known that I, CHRISTIAN H. BROCKMANN, a citizen of the United States, residing at Union Center, in the county of Juneau and State of Wisconsin, have invented certain new and useful Improvements in Draft Equalizers, of which the following is a specification.

This invention relates to improvements in draft equalizers and has for its object to construct an equalizer that tends to equalize the side draft.

An important object of the invention is to provide a reversible equalizer.

A still further object of the invention is to provide an equalizer which may be secured to any farm vehicle or draft implement either with or without a tongue and which may be held by an ordinary pin or clevis.

With the above and such other objects in view as may hereinafter appear, I have invented the device illustrated in the accompanying drawings in which—

Figure 1 is a top plan of an equalizer when used for two horses.

Figure 2 is a similar view with a plate removed and an extension for a third horse attached.

Figure 3 is a section on line 3—3 Figure 1.

Figure 4 is a section on the line 4—4 of Figure 2.

Like reference characters indicate like parts throughout the following specification and in the several views in the drawings in which 1 is an equalizer for two or three horses, the ratio indicated as one to two, however, it may be built in a ratio of one to three or one to four, four or five horses may be used abreast as required, one horse in the furrow and the others on the land when used in connection with gang plows, etc. The device consists of a housing comprising supporting plates 2 and 3 on equalizer bar 4 eccentrically pivoted at 5 between said plates, draft bars 6 and 7 pivoted to the ends of said bar 4, fulcrum bearings 8 and 9 for said bars 6 and 7 and an extension bar 10 for the bar 7.

An offset bearing 11 is provided on plate 2 which is tubular and aligns with a similar offset tubular member 12 on plate 3 through which a draft pin or clevis may be secured to attach the device to the drawn implement.

As clearly seen in Figure 5, the bearing boss 12 is provided with a reduced tubular extension which projects through the opening in the equalizer bar and abuts the boss 11 for maintaining the bosses in spaced relation to the moving parts to minimized friction.

Tubular lugs 13 and 14 are provided on plates 2 and 3 between which the bar 4 operates, and which align with a bore 15 in bar 4 when said bar is parallel with said plates 2 and 3 so that bolts 16 may be projected through said members to hold the equalizer bar stationary when it is required to use it with only two horses. The ends 17 and 18 of the bar 4 are slotted to receive the ends 19 and 20 of the draft bars 6 and 7, rivets 21 and 22 passing through said ends 17 and 18 project through elongated slots 23 and 24 in the ends 17 and 18, whereby said bars 6 and 7 are pivoted to the bar 4 and play between said members is provided so as to permit sufficient flexibility of the equalizer. It will be noted that a shorter fulcrum end 19 is provided on bar 6 than the fulcrum end 20 of bar 7, the latter being the end to which the larger number of horses are hitched when being used for more than two draft animals, in which case the extension bar 10 is attached to bar 7 and fixedly secured thereto by means of the bolts 25 and 26 and the flanges 27 and 28 of said bar 10 which straddle the end of bar 7. The plates 2 and 3 are secured together by a series of bolts 28 and 29 which project through collars 30 which form spacers between the plates 2 and 3.

One particular advantage of the above described device is that it may be reversed so that the odd horse may work on either side of the vehicle or implement. Another special advantage is that merely by removing or replacing the bolt 16 the device may be converted into either an ordinary double tree or an equalizer for three or more horses.

Having now described my invention, that which I claim as new and desire to procure by Letters Patent is:

1. A draft equalizer comprising a pair of plates, each having an opening, a tubular boss formed on each plate surrounding the opening therein, an equalizer bar having an opening therein, and one of said bosses having a reduced tubular extension adapted to project through the opening in the equalizer bar and abut with the coacting boss for properly spacing the bosses from the bar.

2. A draft equalizer comprising a pair of plates, retained in spaced relation to each other, draft bars fulcrumed between the plates and at their ends, an equalizer bar disposed between the draft bars and pivoted eccentrically between the plates, said pair of plates having aligning apertures disposed in longitudinal alignment with the fulcrums of the draft bars, said equalizer bar having an aperture therein adapted for alignment with said apertures in the plates when the equalizer bar aligns with said plates, and a pin insertible into the aligning apertures of the pair of plates, and the equalizer bar for locking the latter against movement.

In testimony whereof I affix my signature in the presence of two witnesses.

CHRISTIAN H. BROCKMANN.

Witnesses:
 CARL HERREWIG,
 E. G. LAWSHA.